United States Patent
Gamble et al.

(10) Patent No.: US 6,489,701 B1
(45) Date of Patent: Dec. 3, 2002

(54) SUPERCONDUCTING ROTATING MACHINES

(75) Inventors: Bruce B. Gamble, Wellesley; Gregory L. Snitchler, Shrewsbury; Dariusz Antoni Bushko, Hopkinton; Swarn S. Kalsi, Shrewsbury; Peter M. Winn, Framingham, all of MA (US); William T. Sand, Cumberland, RI (US)

(73) Assignee: American Superconductor Corporation, Westborough, MA (US)

( * ) Notice: Subject to any disclaimer, the term of this patent is extended or adjusted under 35 U.S.C. 154(b) by 0 days.

(21) Appl. No.: 09/415,626

(22) Filed: Oct. 12, 1999

(51) Int. Cl.[7] .......................... H02K 9/00; H02K 55/00; H02K 55/04
(52) U.S. Cl. .......................... 310/179; 310/54; 310/55; 310/261; 310/231
(58) Field of Search .............................. 310/52, 54, 55, 310/57, 261, 58, 254, 59, 238, 60 R, 231, 61, 219, 64, 86; 505/166; 62/51.1

(56) References Cited

U.S. PATENT DOCUMENTS

| | | | |
|---|---|---|---|
| 319,434 A | 6/1885 | Wren | 505/166 |
| 2,844,745 A | * 7/1958 | Hamm | 310/57 |
| 3,492,830 A | 2/1970 | Mulder | 62/45 |
| 3,704,600 A | 12/1972 | Prast et al. | 62/457 |
| 3,882,687 A | 5/1975 | Asztalos et al. | 62/64 |
| 3,963,950 A | * 6/1976 | Watanabe et al. | 310/54 |
| 4,041,541 A | * 8/1977 | Frossard et al. | 361/27 |
| 4,079,273 A | 3/1978 | Lambrecht et al. | 310/52 |
| 4,101,793 A | 7/1978 | Berthet et al. | 310/52 |
| 4,111,002 A | 9/1978 | Van Mal et al. | 62/467 |
| 4,123,677 A | 10/1978 | Laskaris et al. | 310/52 |
| 4,164,126 A | 8/1979 | Laskaris et al. | 12/55 |
| 4,223,239 A | 9/1980 | Eckels | 310/52 |
| 4,242,885 A | 1/1981 | Quack et al. | 62/500 |
| 4,275,320 A | 6/1981 | Baumann et al. | 310/52 |
| 4,292,558 A | * 9/1981 | Flick et al. | 310/194 |
| 4,315,172 A | 2/1982 | Intichar et al. | 310/53 |
| 4,323,800 A | 4/1982 | Hofmann | 310/52 |
| 4,339,680 A | 7/1982 | Flecher et al. | 310/62 |
| 4,366,680 A | 1/1983 | Lovelace | 62/514 R |
| 4,406,959 A | 9/1983 | Harano et al. | 310/58 |
| 4,427,907 A | 1/1984 | Flick et al. | 310/52 |
| 4,448,042 A | 5/1984 | Yamaguchi et al. | 62/505 |
| 4,576,009 A | 3/1986 | Ogushi et al. | 62/3 |
| 4,612,486 A | * 9/1986 | Ban et al. | 318/254 |
| 4,692,560 A | 9/1987 | Hotta et al. | 174/15 CA |
| 4,697,425 A | 10/1987 | Jones | 62/48 |

(List continued on next page.)

FOREIGN PATENT DOCUMENTS

| | | | | |
|---|---|---|---|---|
| GB | 2030787 A | | 4/1980 | |
| JP | 55037834 | * | 3/1980 | 310/52 |
| JP | 1-129766 | | 5/1989 | |

OTHER PUBLICATIONS

Patent Abstracts of Japan, vol. 009, No. 152 (M–391), Jun. 27, 1985, & JP 60 029591 A )Mitsubishi Denki KK), Feb. 14, 1985, abstract.

(List continued on next page.)

Primary Examiner—Karl Tamai
(74) Attorney, Agent, or Firm—Fish & Richardson P.C.

(57) ABSTRACT

A superconducting rotating machine has a relatively compact construction while still providing a relatively high output power, thus the superconducting rotating machine has an increased power density characteristic. The superconducting rotating machine includes a stator assembly, a rotor assembly configured to rotate within the stator assembly and having at least one HTS superconducting winding assembly which, in operation, generates a magnetic flux linking the rotor assembly to the stator assembly, and a refrigeration system for cooling the at least one superconducting winding. The superconducting rotating has a gap shear characteristic greater than 10 psi.

16 Claims, 12 Drawing Sheets

U.S. PATENT DOCUMENTS

| | | | | |
|---|---|---|---|---|
| 4,727,724 A | | 3/1988 | Intichar et al. ............... | 62/55.5 |
| 4,862,023 A | | 8/1989 | Laumond et al. ............. | 62/49.1 |
| 4,872,314 A | | 10/1989 | Asano et al. ................... | 62/64 |
| 5,193,349 A | | 3/1993 | Laverman et al. ............ | 62/51.1 |
| 5,325,002 A | * | 6/1994 | Rabinowitz et al. ......... | 505/166 |
| 5,347,256 A | * | 9/1994 | Yumiki et al. ................. | 336/84 |
| 5,461,873 A | | 10/1995 | Longsworth ................. | 62/51.1 |
| 5,469,711 A | | 11/1995 | McCoy ........................ | 62/51.1 |
| 5,482,919 A | | 1/1996 | Joshi ........................... | 300/52 |
| 5,485,730 A | | 1/1996 | Herd ........................... | 62/51.1 |
| 5,513,498 A | | 5/1996 | Ackerman et al. ............ | 62/48.2 |
| 5,548,168 A | * | 8/1996 | Iaskaris et al. ................ | 310/52 |
| 5,777,420 A | * | 7/1998 | Gamble et al. .............. | 310/261 |
| 5,848,532 A | | 12/1998 | Gamble et al. .............. | 62/51.1 |
| 5,886,444 A | * | 3/1999 | Enomoto et al. ............ | 310/208 |

OTHER PUBLICATIONS

Patent Abstracts of Japan, vol. 010, NO. 238 (M–508), Aug. 16, 1986 & JP 61 070387 A (Mitsubishi Electric Corp), Apr. 11, 1986, abstract.

Patent Abstracts of Japan, vol. 1996, No. 11, Nov. 29, 1996 & JP 08 189715 A (Aisin Seiki Co Ltd; Mitsubishi Electric Corp; Central Japan Railway Co), Jul. 23, 1996, abstract.

Supplementary European Search Report; EP 98 91 1374; Mar. 28, 2000; B. Busuiocescu.

Electric Power Research Institute, EL–663 vol. 1, "Superconductor Generator Design," Contract #RP429–2, Mar. 1978, pp. 3–116 to 3–131.

Memorandum by Mr. Bruce Gamble regarding reference: "Development of a Coolant Circuit for Rotors to Superconducting Generators," P.A. Rios, B.B. Gamble and E.T. Laskaris presented at the Conference of Technical Applications of Superconductivity, USSR, 1975 (GE); and Electroc Power Research Institute, vol. 1, "Superconductor Generator Design Final Technical Report," Contract #RP429–02, Dec. 1977.

Edick et al., "High Temperature Superconductivity Applied to Electric Motors", 8382 IEEE Transactions on Applied Superconductivity, 2 (1992) Dec., No. 4, New York.

Singh et al., "Conceptual Design of a High Temperature Superconducting Generator", IEEE Transactions on Applied Superconductivity, vol. 9, No. 2, Jun. 1999.

Spooner et al., "Large Superconducting DC Drives with Separate Torque Reaction Windings", 8095, IEEE Transactions on Industry Applications, vol. 3, Nov./Dec. 1995, New York.

Tixador et al., "Conceptual Design of an Electrical Machine with Bolt Low and High $T_c$ Superconductors", IEEE Transactions on Applied Superconductivity, vol. 7, No. 4, Dec. 1997.

* cited by examiner

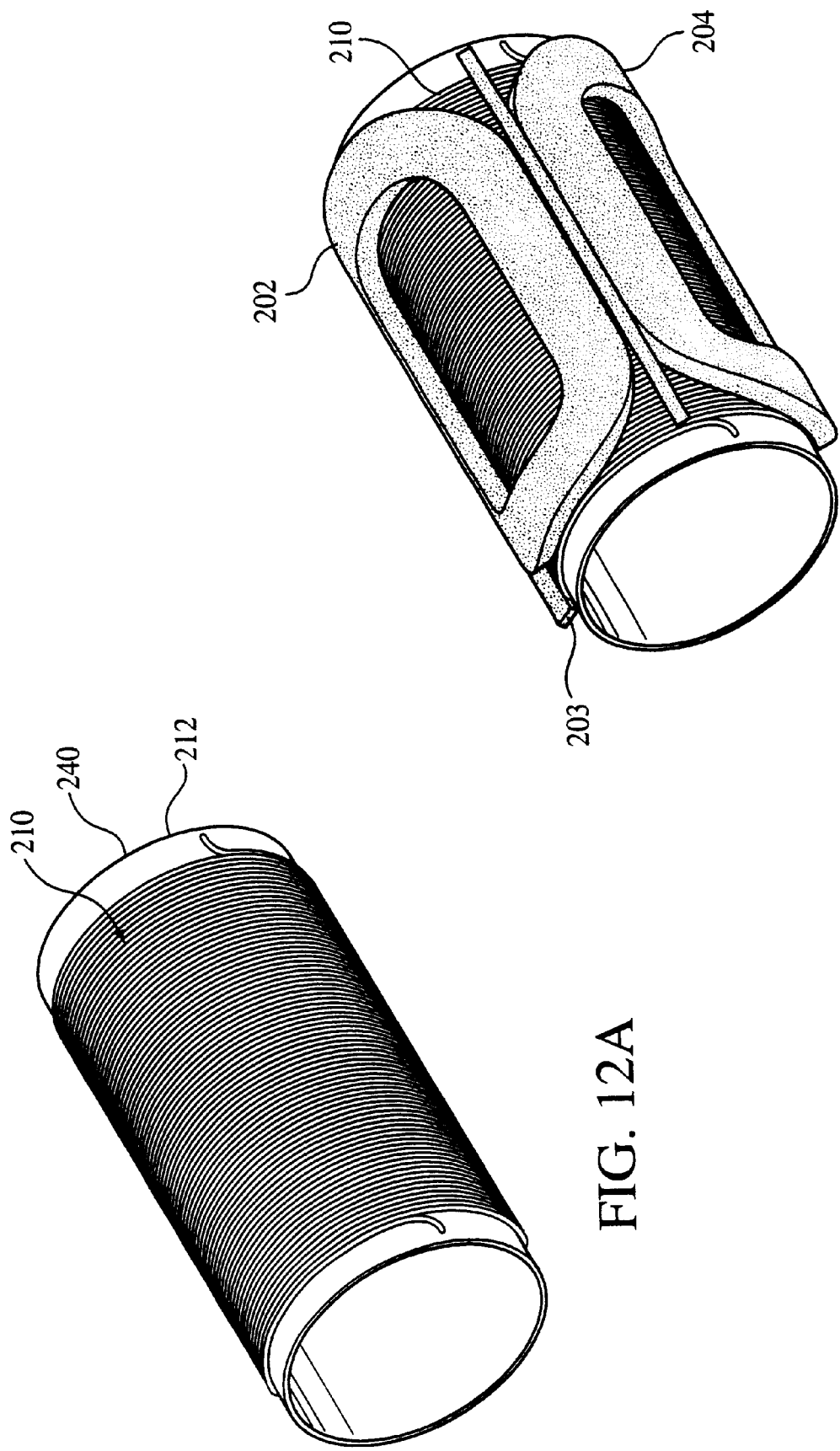

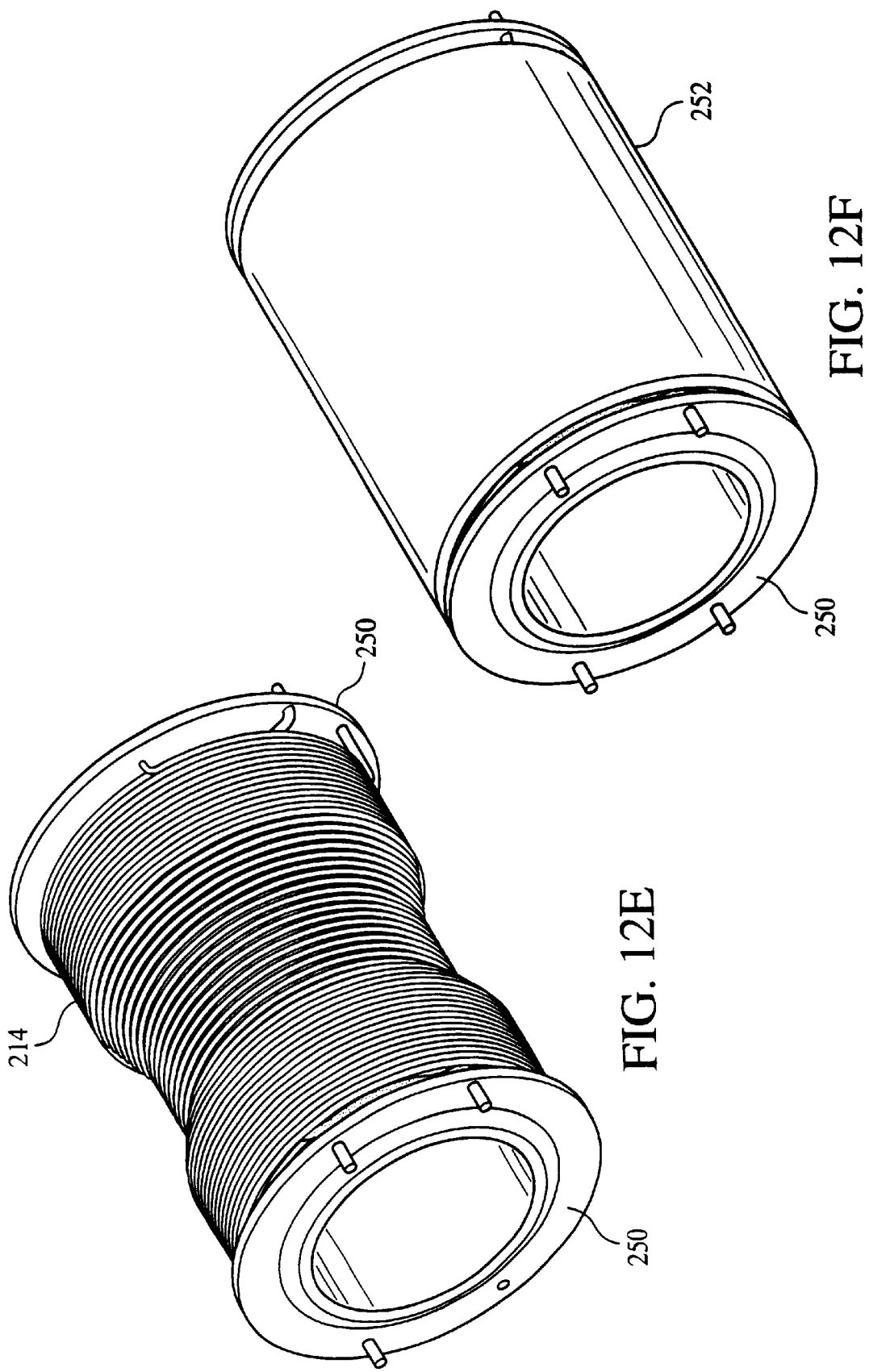

SUPERCONDUCTING ROTATING MACHINES

BACKGROUND OF THE INVENTION

The invention relates to the construction and operation of superconducting rotating machines, including superconducting electric motors.

Superconducting air core, synchronous electric machines have been under development since the early 1960's. The use of superconducting windings in these machines has resulted in a significant increase in the field magnetomotive forces generated by the windings and increased flux and power densities of the machines. These early superconducting machines included field windings wound with low temperature superconductor (LTS), originally with NbZr or NbTi and later with $Nb_3Sn$. The field windings were cooled with liquid helium from a stationary liquifier. The liquid helium was transferred into the rotor of the machine and then vaporized to use both the latent and sensable heat of the fluid to cool the windings. This approach proved to be viable for only very large synchronous motors and generators. With the advent of high temperature superconductor (HTS) in the 1980's, investigations ensued to determine the feasibility of HTS windings in superconducting synchronous machines.

SUMMARY OF THE INVENTION

The invention features a superconducting rotating machine having a relatively compact construction while still providing a relatively high output power. In effect, the construction provides a superconducting rotating machine having an increased power density characteristic. The superconducting rotating machine is of the type having a stator assembly and a rotor assembly which rotates within the stator assembly and is spaced from the stator assembly by a gap.

In one aspect of the invention, the rotor assembly of the superconducting rotating machine includes at least one HTS superconducting winding assembly which, in operation, generates a magnetic flux linking the stator assembly, a refrigeration system for cooling the at least one superconducting winding of the rotor assembly and the superconducting rotating machine has a gap shear stress characteristic in a range between 30 lbs/in$^2$ (psi) and 100 lbs/in$^2$. For example, in one embodiment, the superconducting rotating machine (e.g., motors or generators) has a gap shear stress characteristic of about 45 psi.

Gap shear stress is an effective measure of the torque density of a machine. It relates machine performance to the surface area in the gap between the rotor assembly and stator assembly. In particular, gap shear stress is numerically equivalent to the machine torque divided by the area and radius of the gap. If the rotor experiences a surface shear stress equal to the gap shear stress, a torque equal to the design torque would be transmitted to the shaft of the machine.

Embodiments of this aspect of the invention may include one or more of the following features.

The superconducting rotating machine has a specific power in a range between 1.5 kilowatts/kilogram (kw/Kg) and 4.5 KW/Kg, for example, 2.0 KW/Kg. The superconducting rotating machine has a power density in a range between 1.2 Mwatts/m$^3$ and 4 Mwatts/m$^3$ for an 1800 rpm rotating machine. It is appreciated that as the speed of the rotating machine becomes larger or smaller, the specific power and power density will become proportionally larger or smaller as well.

The superconducting winding assembly includes a superconducting coil having a superconductor tape wound about and disposed along an axis of the winding assembly to provide a plurality of concentric turns defining an opening. The opening has a dimension which gradually decreases, in the direction along the axis, and from a first end to a second end of the winding assembly. Each turn of the superconductor tape has a broad surface maintained substantially parallel to the axis of the winding assembly.

The decreasing dimension opening defined by the winding configuration of the coil provides a coil having a tapered profile. The advantages of a tapered superconducting coil having this arrangement are numerous. For example, the tapered superconducting coil is well-suited for use in applications where the coil is to be positioned in annularly-shaped volumes, such as those commonly found in rotating electric machines. In general, the tapered arrangement eliminates stepped profiles, common with other stacked arrangements. In particular, the tapered superconducting coil requires relatively fewer stacked individual coils to fill annularly-shaped volumes. This is in contrast to other superconducting coil assemblies, which require stacking of many more thin, individual coils to fill an annularly-shaped volume. Moreover, reducing the number of individual coils, in turn, reduces the number of electrical connections between the individual coils, thereby increasing the overall performance and reliability of a coil assembly using tapered coils. In addition, the superconductor tape of the present invention is wound with its broad surface maintained substantially parallel to the axis of the coil (as well as to adjacent turns.) This feature is particularly advantageous when the tape is formed of less flexible, brittle materials, such as ceramic-based high temperature superconducting materials. Furthermore, the tapered configuration provides better critical current ($I_c$) retention characteristics and allows for better coil grading.

In certain embodiments, the superconductor tape is wound in a racetrack shape defining a pair of opposing arcuate end sections and a pair of opposing substantially straight side sections. The superconductor tape includes a multi-filament composite superconductor having individual superconducting filaments which extend the length of the multi-filament composite conductor and are surrounded by a matrix-forming material.

The superconductor tape includes an anisotropic high temperature superconductor, for example, $Bi_2Sr_3Ca_2Cu_3O$. Alternatively, the anisotropic high temperature superconductor is a member of the rare-earth-copper-oxide family.

The rotor assembly includes a cylindrical support member for supporting the superconducting winding assembly.

The cylindrical support member includes end extension members defining warm/cold transition regions. The cylindrical support member is formed of a high strength, low thermal conductivity composite material, for example, a G-10 phenolic or woven-glass epoxy. Thus, the low thermal conductivity composite material thermally isolates the cryogenically-cooled superconducting coils from the outside ambient temperature world. The rotating machine further includes an axially compliant member for radially supporting an end of the cylindrical support member.

The refrigeration system includes a cryocooler located in a stationary reference frame, and a closed circulation system external to the cryocooler interfacing the stationary reference frame with a rotating reference frame in which the superconductor winding assembly is located. Among other advantages, the refrigeration system of the invention permits the cryocooler to remain stationary while eliminating the need for an extensive sealing system needed to flow coolant through an open circulation system.

The closed circulation system includes a heat transfer assembly located in the rotating reference frame and a heat transfer gap defined between the cryocooler and the heat transfer assembly. The heat transfer assembly transfers heat from the superconducting winding assembly to the heat transfer gap. Thus, the heat transfer gap provides an efficient structure for transferring heat from the superconductor winding to the cryocooler. A coolant (e.g., helium, neon, nitrogen, or oxygen) is located in the heat transfer gap.

In one embodiment, the rotating heat transfer assembly includes a heat pipe having a first fluid path for directing a flow of liquid coolant from a cold end to a warm end of the heat transfer assembly, and a second fluid path for directing a flow of gas coolant from the warm end to the cold end of the heat transfer assembly.

The superconducting rotating machine further includes a warm end conduction block and a cold end conduction block, which define the warm end and cold end of the heat transfer assembly, respectively. The warm end conduction block and cold end conduction block are both mounted to the heat pipe. The warm end conduction block is further mounted to the superconducting winding assembly. The cold end conduction block includes first fins and the cryocooler includes second fins rotatable with respect to the second fins and intermeshed with the first fins. The space between the intermeshed fins define the heat transfer gap.

The rotor assembly includes induction structure for carrying current at levels sufficient to allow a transient induction mode of operation. Because induced currents are generated in the rotor assembly in the induction mode, a structure for supporting these currents is necessary. The induction structure is configured to allow the superconducting motor to generate a starting torque which is at least 50% of the rated torque in the induction mode of operation. Further, the induction structure is configured to allow the superconducting motor to generate a peak torque (breakdown torque) which is at least twice the rated torque in the induction mode of operation.

In one embodiment, at least a portion of the induction structure is spaced from the at least one superconducting winding by a thermal isolation vacuum region. That is, a portion of the induction structure is in the warm region of the rotor assembly, such as an electromagnetic shield member. The electromagnetic shield member includes a conductive, non-magnetic material (e.g., copper, aluminum).

The induction structure can also include a cryostat positioned between the thermal isolation vacuum region and the electromagnetic shield member. Thus, the cryostat not only serves to cool the superconducting windings of the rotor assembly, but also serves to support induced currents when the motor operates in the induction mode.

The cold cylindrical support member which supports the at least one superconducting winding can also serve as part of the induction structure.

In certain embodiments, the superconducting electric motor also includes an adjustable speed drive for providing an adjustable frequency electrical signal to the stator assembly.

The superconducting rotating machine also includes an exciter, having a radially laminated rotatable disk including AC windings, and a stationary disk also including AC windings. The stationary disk is axially spaced from the radially laminated, rotating disk to form a gap therebetween. In essence, the rotating disk and stationary disks and coils together provide a transformer to induce AC voltage and current in the rotating coil.

The exciter further includes a rectifier coupled to the AC windings in the rotor and having an output coupled to the DC windings. The superconducting rotating machine further includes a frame for supporting the stationary disk, rectifier and current regulator.

The stator assembly includes a cylindrical support tube having a bore extending along a longitudinal axis of the support tube and a single-layer winding wound along the axis of the support tube. The cylindrical support tube is formed of an electrically resistive composite material including, for example, glass and epoxy. The stator assembly further includes a cooling member (e.g., at least one helically wound tube), thermally coupled to an external surface of the winding, and having at least one passage extending therethrough for receiving a coolant from an external source. The cooling member includes helically wound tubes, a first one of the helically wound tubes disposed between the outer surface of the support tube and an inner surface of single layer winding. A second one of the helically wound tubes is thermally coupled to an outer surface of one of the single layer windings. The windings of the stator are radially spaced from a longitudinal axis of the stator and are circumferentially spaced from each other, with alternate ones of the windings having end regions which extend radially away from the axis. The cooling member further includes an end region helically wound tube that is thermally coupled to the radially-extending end regions. The helically-wound tubes are formed of a non-magnetic material.

The stator assembly includes an outer banded member disposed around the superconducting winding and formed of a high permeability material. In one embodiment, the outer banded material is a steel wire wound around the at least one superconducting winding. This banded member is wound under tension to load the stator assembly against the stator bore tube.

The stator assembly includes an outer housing for enclosing the cylindrical support tube, the single-layer winding, and the outer banded material. The stator assembly also includes an encapsulating material (e.g., adhesive epoxy) surrounding the cylindrical support tube, the single-layer winding, and the outer banded material adhesive within the outer housing.

Other advantages and features of the invention will become apparent from the following description and the claims.

BRIEF DESCRIPTION OF THE DRAWINGS

FIGS. 12A–12F illustrate an approach for assembling the stator assembly of FIGS. 10 and 11.

DETAILED DESCRIPTION

Figure 1:
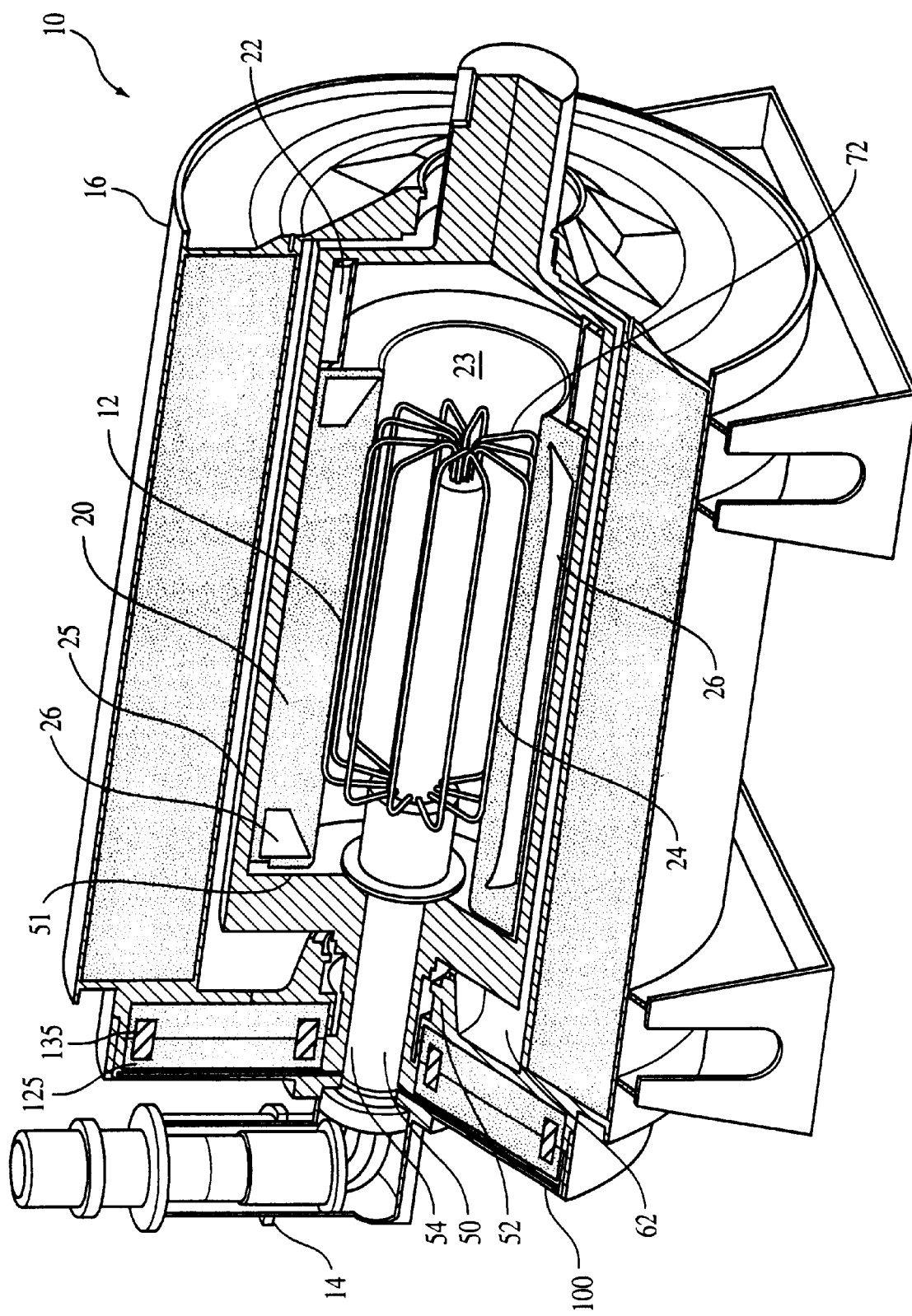
FIG. 1 is a cross-sectional perspective view of a superconducting synchronous motor in accordance with the invention.

Referring to FIG. 1, a superconducting synchronous motor 10 includes a rotor assembly 12 cooled by a Gifford McMahon (GM) cryocooler 14 and surrounded by a stator assembly 16. As will be described in greater detail below, each of these components and assemblies have features which contribute toward both increasing the overall performance, as well as reducing the overall size of motor 10. In particular, superconducting synchronous motor 10 has been shown to have a greatly improved gap shear stress characteristic in a range between 30 psi and 100 psi. For example, for a superconducting synchronous motor rotating at 1800 rpm, the gap shear stress around 45 psi and have a power density in a range between 1.2 Mwatts/m$^3$ and 4 Mwatts/m$^3$ for an 1800 rpm machine. Such a motor can have a specific power in a range between 1.5 kW/Kg and 4.5 KW/Kg.

Figure 2:
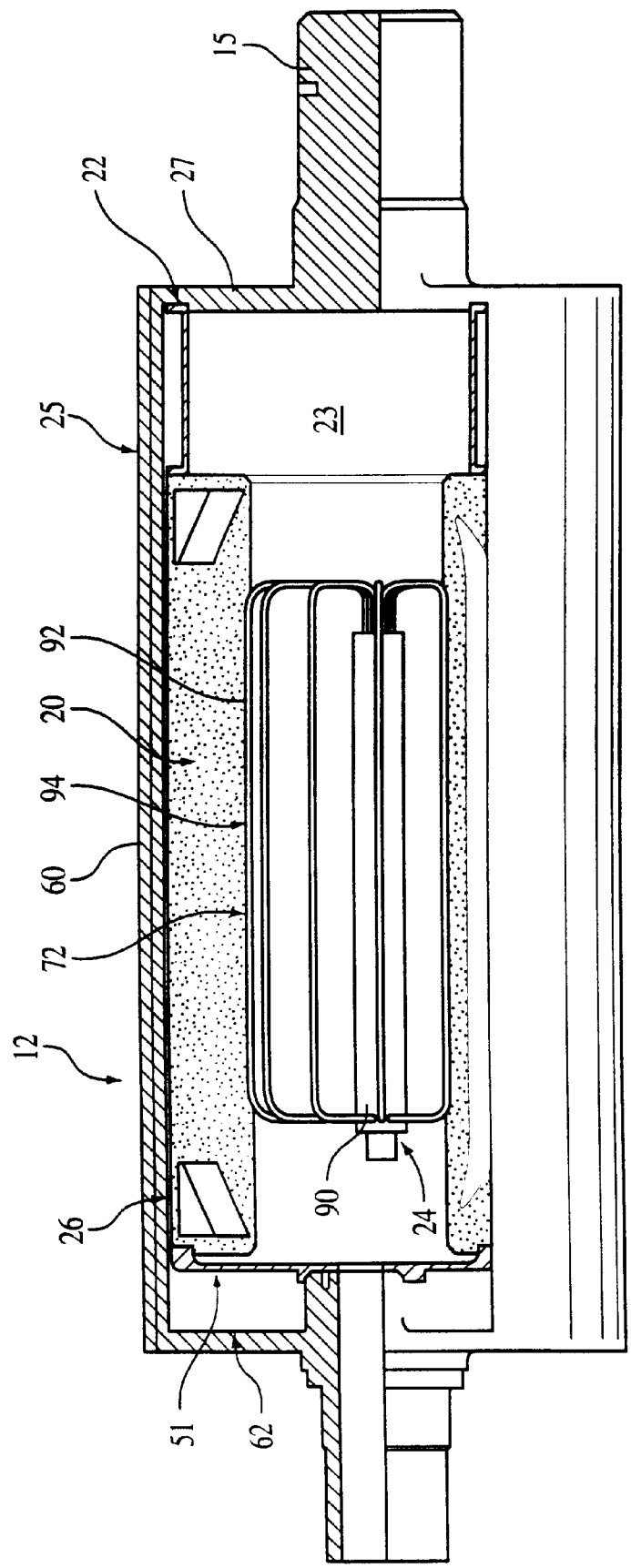
FIG. 2 is a cross-sectional side view of a rotor assembly of the superconducting synchronous motor of FIG. 1.
Figure 3:
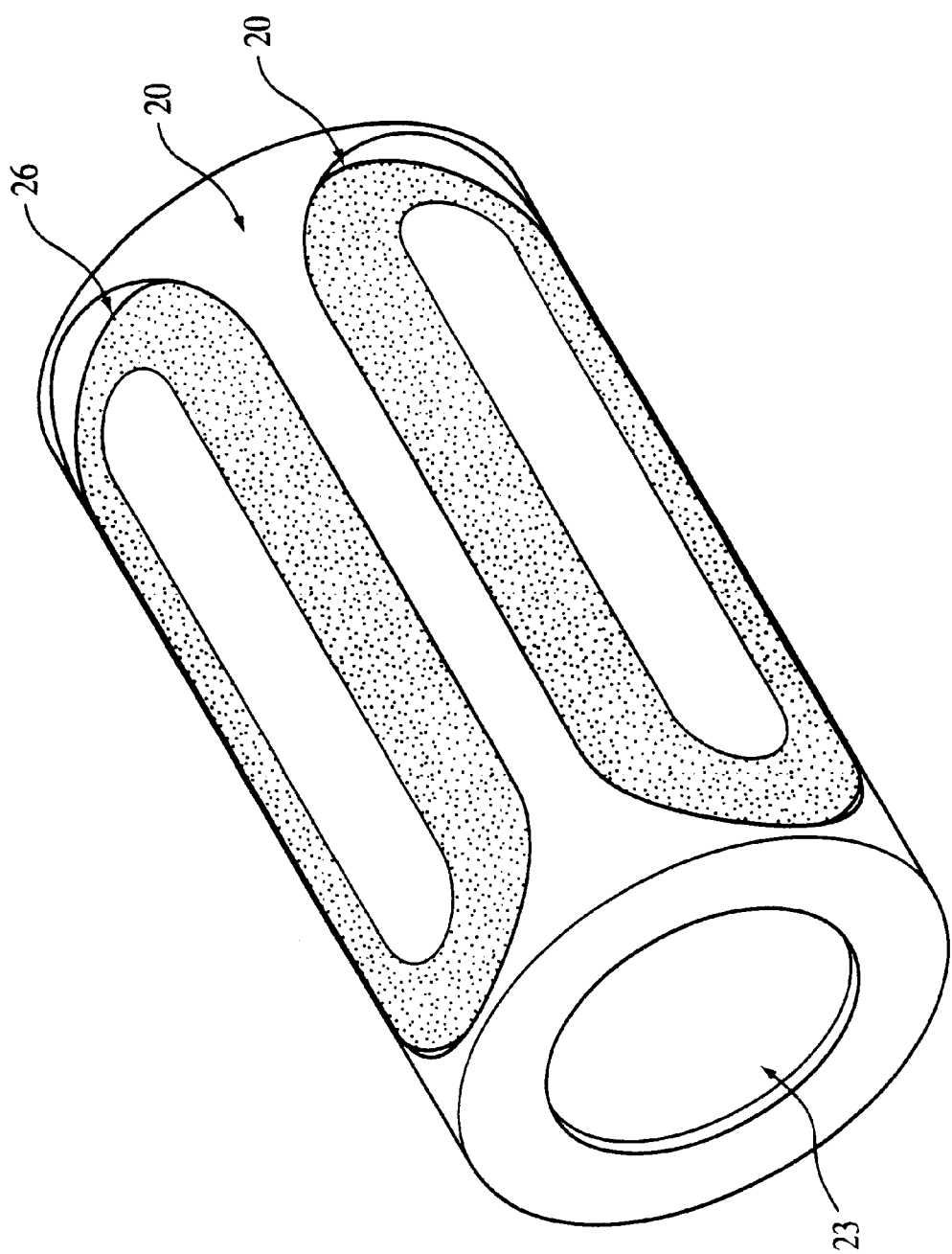
FIG. 3 is a perspective view of a coil support member of the rotor assembly of FIG. 2.

Referring to FIGS. 2 and 3, rotor assembly 12 includes a cryostat 25 which defines a vacuum enclosure and is connected to a shaft 15 at an end bell 27 of the cryostat. In this embodiment, cryostat 25 is approximately 42 inches in length and has a diameter of about 19 inches. Disposed within cryostat 25 is a cold support member 20 fabricated from a high-strength and ductile material (e.g., stainless steel, aluminum). Cold support member 20 includes an outer surface upon which four HTS superconducting coil assemblies 26 are mounted and epoxy impregnated. Cold support member 20 also includes an inner bore 23 within which a heat transfer assembly 24 is positioned. As will be described in detail below, heat transfer assembly 24 is used to conduct heat transfer to and generated by coil assemblies 26 to cryocooler 14 where the heat can be dissipated. In particular embodiments, cryostat 25 includes an outer cylindrical wall which, for reasons discussed below, serves as an electromagnetic shield.

Rotor assembly 12 also includes a torque tube 22 for transferring the rotational forces of rotor assembly 12 to shaft 15. Torque tube 22 is formed of a high strength, low thermal conductivity composite material, such as a G-10 phenolic or woven-glass epoxy. In one embodiment, end rings (not shown) with circular grooves are bolted to opposing surfaces of the end bell 27 and cold support member 20. Torque tube 22 is then adhesively attached (e.g., with epoxy) within the grooves.

The opposite, non-driven, end of the rotor assembly 12, includes a disk-shaped support plate 51 to support and center cold support member 20 within rotor assembly 12. Support plate 51, which may be a solid member or have a spoked arrangement, is formed of a composite material, such as that used for torque tube 20. The material is selected to be compliant in the axial direction and relatively stiff in the radial direction. For reasons discussed below, bearings 52 are positioned between cryostat 25 and cold support member 20 of rotor assembly 12 so that the coldhead remains stationary when the cryostat rotates.

As shown more particularly in FIG. 3, each of superconducting coils 26 is spaced from each other in a four-pole quadrature topology. As will be described immediately below, superconducting coils 26 have a tapered construction which, among other advantages, allows the coils to conform to the outer surface of cold support member 20, thereby providing a more compact and integrated structure.

Figure 4:
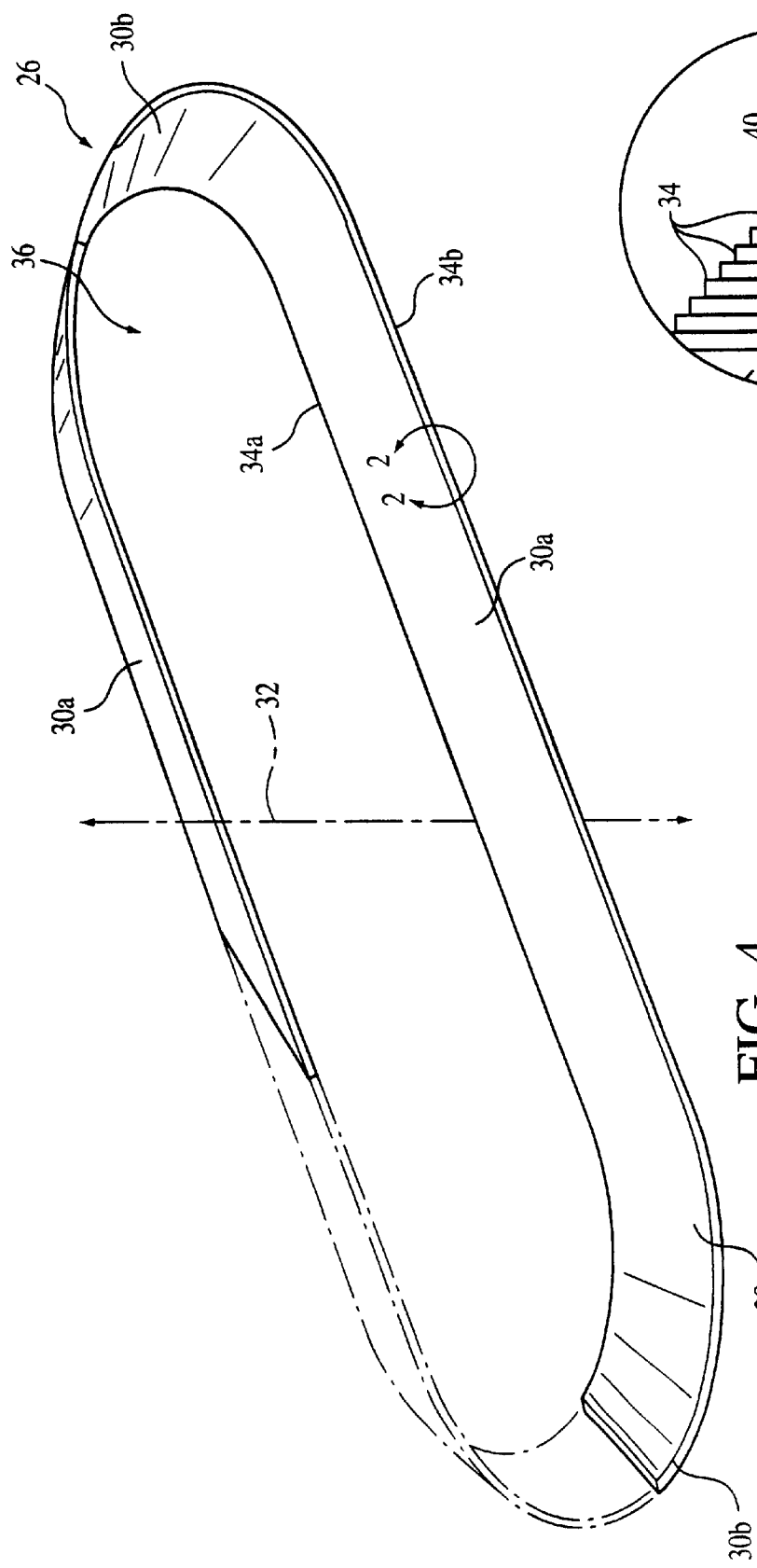
FIG. 4 is a perspective, partially cutaway view of a superconducting coil of the rotor assembly of FIG. 2.

Referring to FIG. 4, each superconducting coil assembly 26 includes at least one superconductor sub-coil (only one shown) wound with a superconductor tape 28 wound generally in an elongated oval or racetrack shape. The "racetrack-shaped" superconducting coil assembly 26 includes a pair of opposing and generally straight side sections 30a and a pair of opposing curved end sections 30b, which together form a generally rectangularly-shaped coil with rounded corners. It is important to note that although coil assembly 26 is "racetrack-shaped," it does not have the shape or structure of the well-known racetrack coil. As will be described below in conjunction with one fabrication approach, each coil of coil assembly 26 is wound about an axis 32 of the coil assembly from a continuous length or series of lengths of superconductor tape, thereby forming a number of windings or turns 34 of the coil (see FIG. 5). The turns, in combination, define an opening 36 which, as will be described in greater detail below, increases in size from the innermost turn to the outermost turn. This approach for winding the superconductor tape is often referred to as pancake winding, in which the superconductor tape is wound one turn on top of a preceding turn thereby forming a plane of turns perpendicular to axis 32 of coil assembly 26.

Figure 5:
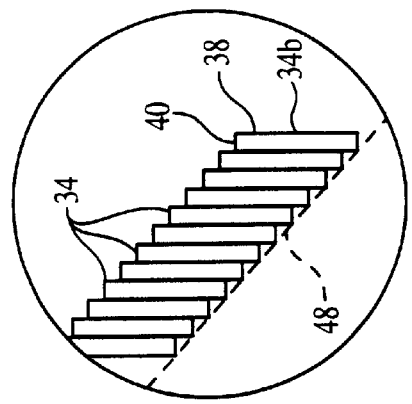
FIG. 5 is an exploded view of a portion of the superconducting coil along line 5—5 of FIG. 4.

Referring to FIG. 5, superconductor tape 28 includes broad sides 38 and narrow sides 40. In one embodiment, superconductor tape 28 includes a multi-filament composite superconductor layer 42 (FIG. 6) having individual superconducting filaments extending substantially the length of the multi-filament composite conductor and surrounded by a matrix-forming material, such as silver. The superconducting filaments and matrix-forming material together form the multi-filament composite conductor. In many applications, the superconducting filaments and the matrix-forming material are encased in an insulating layer (not shown).

Figure 6:
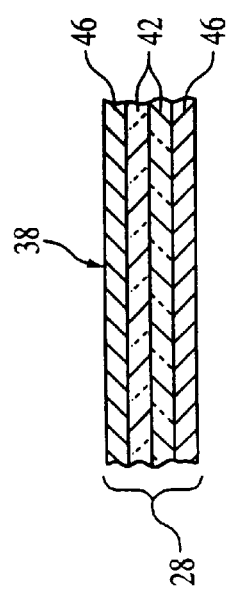
FIG. 6 is a cross-sectional side view of a portion of a superconductor tape for winding the superconducting coil of FIG. 4.

Referring to FIG. 6, in one embodiment, a pair of superconductor layers 42 are sandwiched between a pair of reinforcement members 46, for example of stainless steel, which provide mechanical support to the superconductor layers 42. One approach for fabricating a reinforced superconductor tape in this manner is described in U.S. patent application Ser. No. 08/701,375, assigned to American Superconductor Corporation, assignee of the present invention, and incorporated herein by reference.

Referring again to FIG. 5, each turn 34 of superconductor tape 28 is wound such that each turn is slightly offset, in the direction of axis 32, from a preceding turn so that from the innermost turn 34a (FIG. 4) to the outermost turn 34b, coil assembly 26 is wound in tapered fashion along an imaginary line 48. It is important to note that broad sides 38 of each turn 34 are parallel to each other and to axis 32.

In this embodiment, the conductor is a high temperature copper oxide ceramic superconducting material, such as $Bi_2Sr_2Ca_2Cu_3O_x$, commonly designated BSCCO 2223. Other high temperature superconductors including YBCO (or superconductors where a rare earth element is substituted for the yttrium), TBCCO (i.e., thallium-barium-calcium-copper-oxide family), and HgBCCO (i.e., mercury-barium-calcium-copper-oxide family) are also within the scope of the invention. As shown here, coil assembly 26 may be formed with pancake coils. In certain embodiments, double pancake coils with the two coils of a pair being wound from the same continuous length of superconducting tape may be used. In this case, a pancake coil may include a diameter smaller than its associated pancake coil of the double pancake. An approach for using this approach is described in U.S. Pat. No. 5,581,220, which is assigned to the assignee of the present invention and incorporated herein by reference. Preferred embodiments are based on the magnetic and thermal properties of high temperature superconducting composites, preferably including superconducting ceramic oxides and most preferably those of the copper oxide family.

Because superconducting coils 26 are tapered, either linearly or in a curved manner, the coils can conform easily within and fill annular regions of rotor assembly 12. Unlike, conventional stacked pancake arrangements, far fewer coils are needed to fill the space, thereby reducing the number of connections and increasing the reliability and performance of the coil assemblies. Thus, a more efficient, easy to assemble motor construction is provided. Moreover, tapered coils are advantageously positioned closer to the armature of the motor.

Further, in many applications, annular regions formed on cold support member 20 may be formed such that the stacked tapered superconducting coils are substantially identical, which further reduces manufacturing costs. A stacked set of substantially identical tapered superconducting coils are simply connected and positioned within the annular regions.

Another important advantage of the tapered superconducting coil assembly 26 is that, in a stacked arrangement, the configuration has the benefit of shielding inner ones of the stacked coils from fields perpendicular to the broad face of the superconductor tape. Thus, a series of the tapered superconducting coils can be stacked so that the those coils having better performance characteristics are placed on the top and bottom of the stack. Other details relating to the structure and methods for constructing tapered coils is described in U.S. patent application Ser. No. 09/359,497, assigned to American Superconductor Corporation, assignee of the present invention, and incorporated herein by reference. As is described in this reference, the superconducting coils can be both tapered along a straight line as well as along a curved line. That is, imaginary line 48, as shown in FIG. 5, would be curved rather than straight.

Referring again to FIG. 2, superconducting motor 10 includes an electromagnetic shield 60 formed preferably from a non-magnetic material (e.g., aluminum, copper). In embodiments in which cryostat 25 is formed of a different material, such as stainless steel, shield 60 can be shrunk around the outer wall of the cryostat. As will be described below, in conjunction with the discussion of stator assembly 16, electromagnetic shield 60 acts as an induction structure (i.e., supports induction currents) and is, therefore, multi-purposed. Specifically, shield 60 intercepts AC magnetic fields from the stator before they impact the superconducting windings 26 of the rotor assembly 12. Further, because electromagnetic shield 60 acts as induction structure, it can be used to operate the synchronous superconducting motor 10 at start-up in a synchronous mode. This mode of operating a synchronous motor is described in U.S. patent application Ser. No. 09/371,692, assigned to American Superconductor Corporation, assignee of the present invention, and is incorporated herein by reference.

Figure 7:
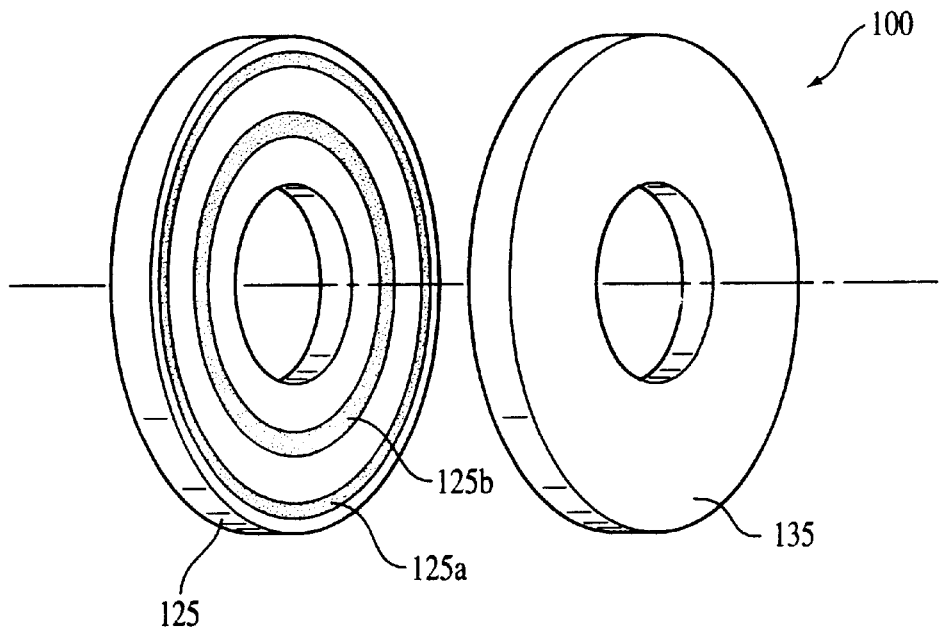
FIGS. 7 and 8 illustrate an exciter assembly of the superconducting synchronous motor of FIG. 1.
Figure 8:
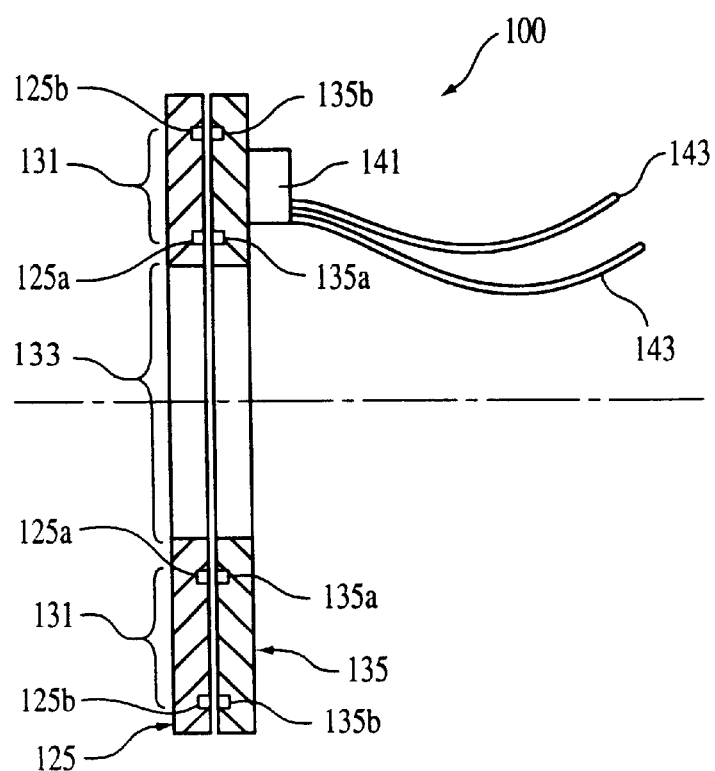

Referring to FIGS. 7 and 8, superconducting motor 10 includes a brushless exciter 100 for supplying a DC exciter current to superconducting coils 26. Brushless exciter 100 includes a rotating disk 125 spaced from a stationary disk 135 (e.g., spaced 1–4 mm). With reference to FIG. 1, note that stationary disk 135 is mounted to stator assembly 16. In other embodiments, however, the relative positions of disks 125, 135 can be reversed.

Rotating disk 125 is formed of a high permeability material (e.g., iron) and includes a pair of concentric grooves 127a, 127b within which a pair of coil windings 125a, 125b are disposed, respectively. Stationary disk 135 is similarly formed of a high permeability material and includes a pair of concentric grooves 129a, 129b within which a pair of coil windings 135a, 135b are disposed, respectively. In one particular embodiment, coil windings 125a, 125b both include 50 turns and carry 10,000 amperes turns. In this embodiment, coil windings 135a, 135b are sufficient to generate 0.5 tesla in ;the gap between disks (e.g., 20,000 ampere turns). To reduce eddy currents, rotating disk 125 and stationary disk 135 are formed as laminations separated by varnish or oxide.

Disks 125, 135 are positioned such that windings 125a, 125b are positioned directly across from windings 135a, 135b, respectively. Each of the coil windings is wound from a continuous copper wire. However, current is applied to coil windings 125a and 135a with an opposite sense than a current applied to coil windings 125b and 135b. With this arrangement, the direction of the flux lines from the windings are in opposite directions and, therefore cancel, in region 133. On the other hand, the direction of the flux lines from the windings are in the same directions and, therefore add, in regions 131.

In essence, this arrangement provides a transformer having a primary which rotates relative to a secondary of the transformer (or vice versa). An important feature of this particular arrangement is that the flux linkage generated by stationary disk 125 and rotating disk 135 when stationary is the same as when the rotating disk rotates. This feature advantageously allows superconducting coils 26 to be charged prior to rotating disk 125 rotating (i.e., before motor 10 operates).

Figure 9A:
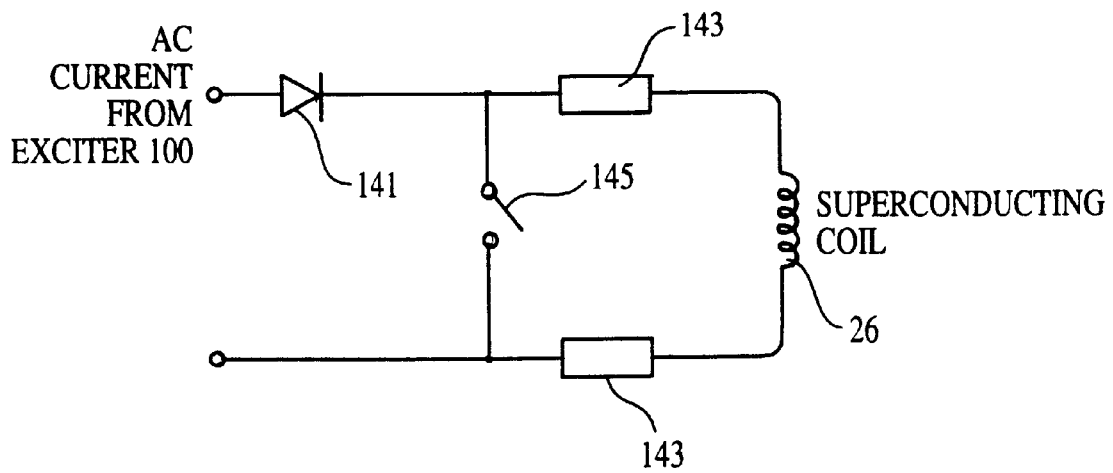
FIGS. 9A and 9B illustrate electronics associated with the exciter assembly of FIGS. 7 and 8.

Referring to FIG. 9A, in operation, AC current (e.g., 20,000 ampere turns) is applied to windings 135a, 135b of stationary disk 135. An AC current (e.g., 200 amps for 50 turns) is induced in windings 125a, 125b of rotating disk 125. Exciter 100 includes a thyristor 141 for rectifying the AC current to a DC current required by superconducting coils 26. The DC current is provided to coils 26 via current leads 143 formed, for example, from a suitable conductor, such as phosphorous deoxidized copper or lead-copper. A switch 145 is positioned in parallel with the superconducting coils to provide a persistent path for current to flow when thyristor 141 is not conducting.

Figure 9B:
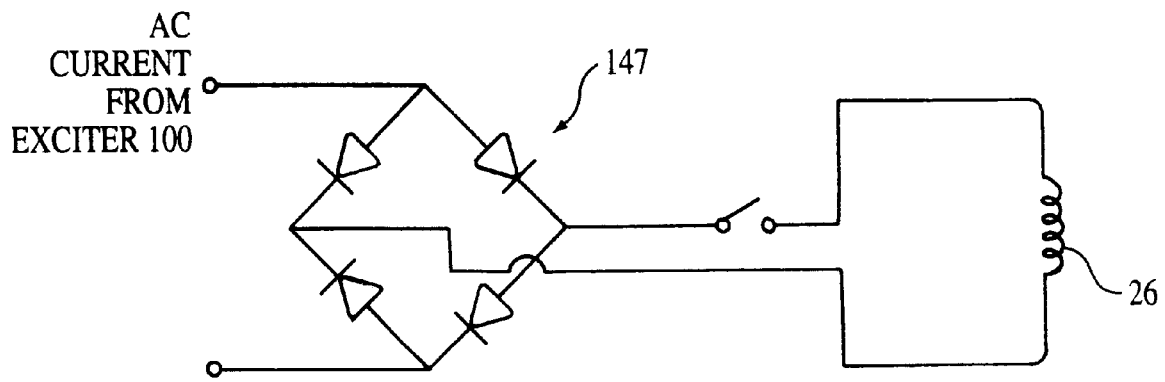

In an alternative embodiment, a full-wave bridge rectifier can be substituted for the thyristor, as shown in FIG. 9B. Other approaches, as well, for charging the superconducting coil windings. For example, in certain applications, the approach described in PCT application WO 98/00848, assigned to the assignee of this invention, and incorporated by reference may be preferable.

Figure 10:
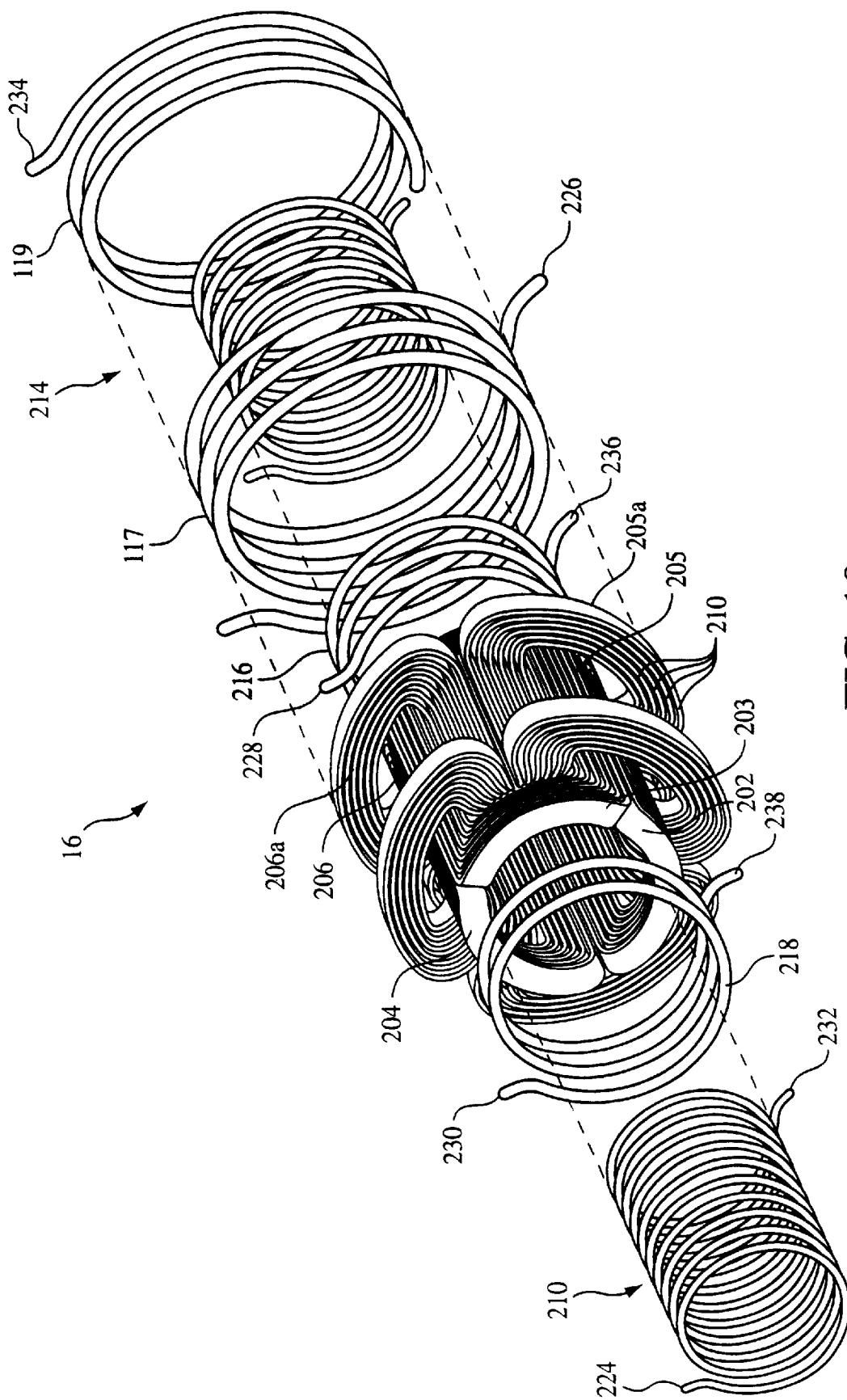
FIGS. 10 and 11 illustrate a stator assembly for the superconducting motor of FIG. 1.
Figure 11:
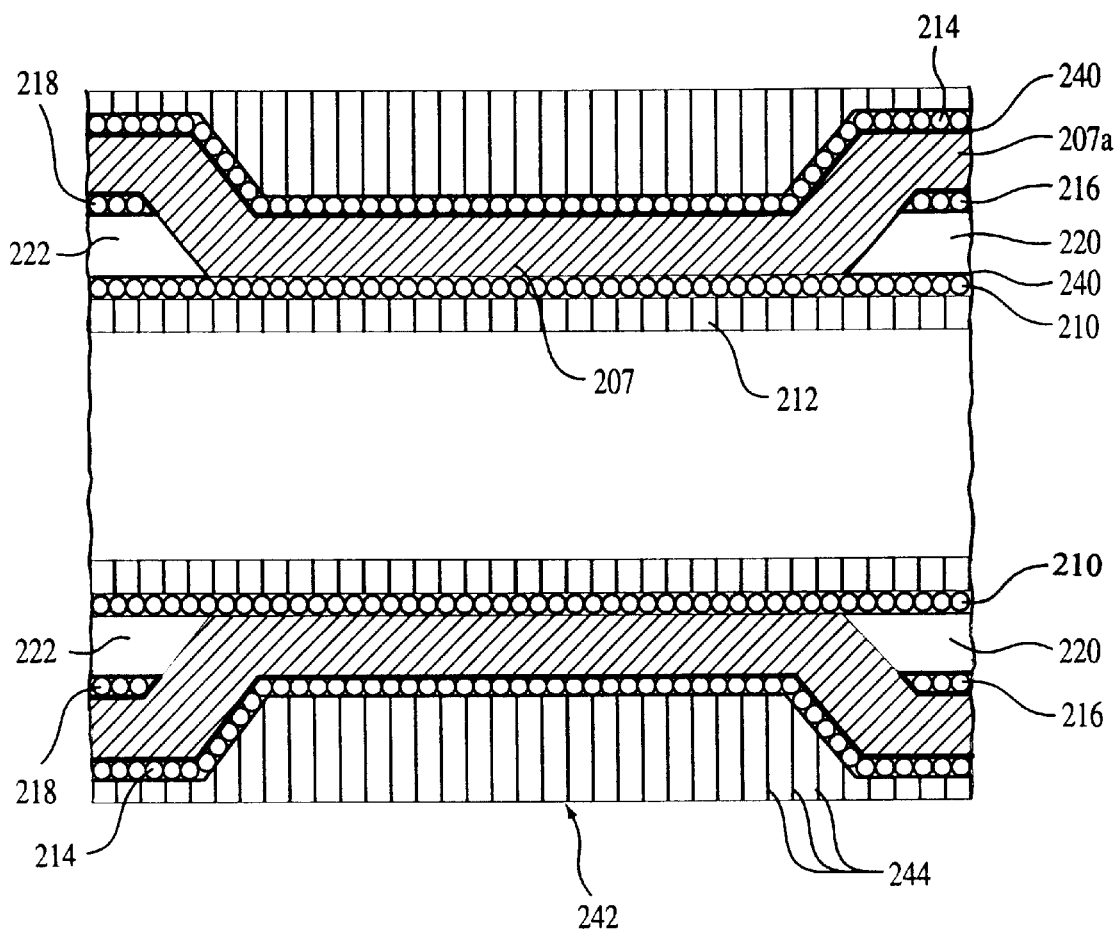

Referring to FIGS. 10 and 11, stator assembly 16 includes multiple phase coil assemblies 202–207 which are arranged into an inner layer of phase coil assemblies 202, 203, 204 and an outer layer of phase coil assemblies 205, 206, 207. The outer layer of coil assemblies 205, 206, 207 have end regions 205a, 206a, 207a which extend away from corresponding end regions of adjacent inner phase coils (outer coil assembly 207 and end region 207a are not shown in FIG. 10). Note that the degree to which end regions 205a, 206a, 207a of the outer layer coil assembly 205, 206, 207 extend away from adjacent inner coils is exaggerated in FIG. 1 (see FIG. 11).

Each phase coil assembly includes concentric coil windings 210 which are insulated from each other. Individual phase coil windings 202–207 are made from an electrically conductive material, preferably copper. Phase coil assemblies can be constructed using different methods. In the embodiment shown in FIG. 10, for example, each phase coil assembly includes many concentric individually insulated coil windings. Typically, each phase coil assembly can include any number of concentric coil windings depending upon the stator motor design. Additionally, each concentric coil winding can include individually insulated coils assembled together to form the concentric coil winding. The individual coils can be insulated to withstand coil-to-coil voltage and assembled to form the concentric coil winding. Each concentric coil windings is then assembled to form a phase coil assembly which is insulated to full phase-phase and phase-ground voltage levels.

In order to reduce eddy-current losses in these coils, it is generally desirable that the conductive material be in the form of a fully transposed Litz-type cable. In certain applications, a Rutherford type conductor may be used. A Rutherford type conductor includes many smaller strands which are fully transposed to decouple an AC field experienced by a conductor in any orientation. Rutherford conductors are also flexible making the task of coil fabrication easier. Phase coil assemblies 202–207 are insulated to industry acceptable insulation classes (such as class H and F insulations) which normally dictate the highest temperature that the conductor could be operated at. Likewise, Rutherford type conductors are readily available from a number of vendors such as New England Electric Wire, Lisbon, N.H.

Stator assembly 16 includes an inner cooling coil 210 extending from an inlet 224 to an outlet 232 and wound around a non-metallic bore tube 212 (FIG. 15) which defines a central bore of the stator assembly. An outer cooling coil 214 extending from an inlet 226 to an outlet 234 is wound about the outer surface of the phase windings. Similarly, cooling end coils 216, 218 extend from inlets 228, 230 to outlets 236, 238, respectively. Cooling end coils 216, 218 are wrapped between end regions 220, 222 of inner layer coil assemblies and end regions 205a, 206a, 207a of outer layer coil assemblies 205, 206, 207.

Inner cooling coil 210, outer cooling coil 214, and end cooling coils 216, 218 are electrically insulated from the phase windings by insulative layers 240. Insulative layers 240 maintain the cooling coils at ground potential, thereby permitting the use of fresh water, which contains ions. Insulative layers 240 are made from any insulating material that can withstand operating voltages of and the heat generated by stator assembly 16.

In general, insulator 150 has a thickness to withstand the operating voltage. The thickness of insulative layers 240 is determined by the dielectric strength (insulating properties) of the material, typically between about 0.001 to 0.100 inches. Examples of materials for insulative layers include, but are not limited to, epoxy, mica, and glass filament.

In one embodiment, stator assembly 16 is encased in a core 160 constructed from 0.02 inch thick iron laminations, e.g., those used by the motor industry. The laminations are cut in circular segments and assembled around the phase windings and cooling tubes. In this embodiment, core 160 is insulated by a varnish or oxide for eliminating eddy-current heating.

In a preferred embodiment, however, core 242, preferably in the form of a steel wire overband 244, which mechanically binds stator assembly 16. Because the steel wire overband replaces the more expensive laminations and allows assembly from the inside-out rather than from outside-in, the cost of construction is significantly reduced. Wire wound core also has low eddy current losses in the end region, as compared with a laminated core, because the field is perpendicular to the laminations in the end region where wound iron wire offers the same cross-section in all directions. Also, wire applied with a large tension keeps all stator coils compacted in a monolithic body throughout the life of the device. Sufficient layers of this wire could be applied to produce a smooth cylindrical outer surface 170 shown in FIG. 11.

Figure 12D:
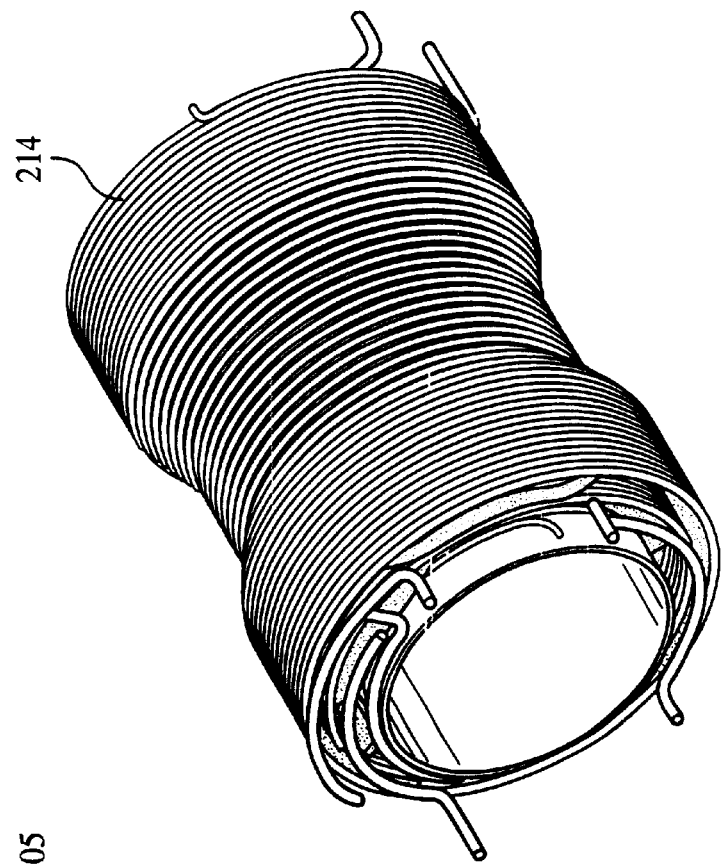
Figure 12C:
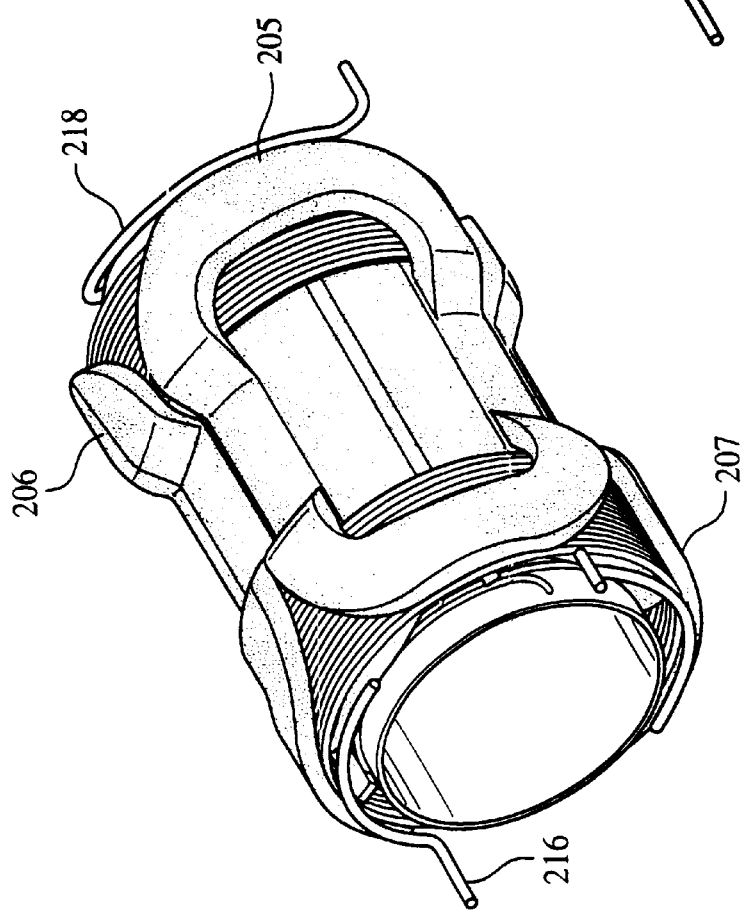

Referring to FIGS. 12A–12F, an approach for constructing stator assembly is shown. As shown in FIG. 12A, insulative layer 240 is provided over the outer surface of inner bore tube 212. Cooling tube 214 is then wound over insulative layer 240. Three phase coil assemblies 202, 203, 204 are positioned over cooling tubes 214 (FIG. 12B). Cooling tubes are wound over the end turns of these 3 coils. Next, as shown in FIG. 12C, the remaining phase coil assemblies 205, 206, 207 are positioned among three phase coils. Outer cooling tube 214 is then wound over all phase assemblies (FIG. 12D) and end plates are positioned at end regions of stator assembly (FIG. 12E). At this point, the assembly is overbanded with insulated steel wire under tension to preload the assembly. As shown in FIG. 12F, stator assembly 16 is inserted within an outer shell 252. The entire assembly is impregnated with an epoxy to bond all components of the stator assembly together to produce a monolithic structure. Examples of insulative materials include, but are not limited to, epoxy, mica, and glass. Further details of the construction and operation of stator assembly 16 are described in Ser. No. 60/149,129, filed Aug. 16, 1999, and incorporated herein by reference.

Referring to again to FIG. 1, superconducting motor 10 includes a refrigeration system for cooling superconducting coils 26. Cryocooler (or coldhead) 14 extends into cryostat 25 through an extension tube 50. Cryocooler 14 is located in a stationary reference frame (rather than a rotating reference frame) due to undesirable high gravity heat transfer seen internal to the cryocooler if it were to rotate. It is important to note that coolant never enters cryocooler 14, but rather is cooled by contact with an external surface of the cryocooler, described below. Heat transfer between superconducting coils 26 and cryocooler 14 occurs by various means, for example, conduction, convection, and mass transport. In general, no external force, for example, pumping, is applied to the coolant.

Figure 13:
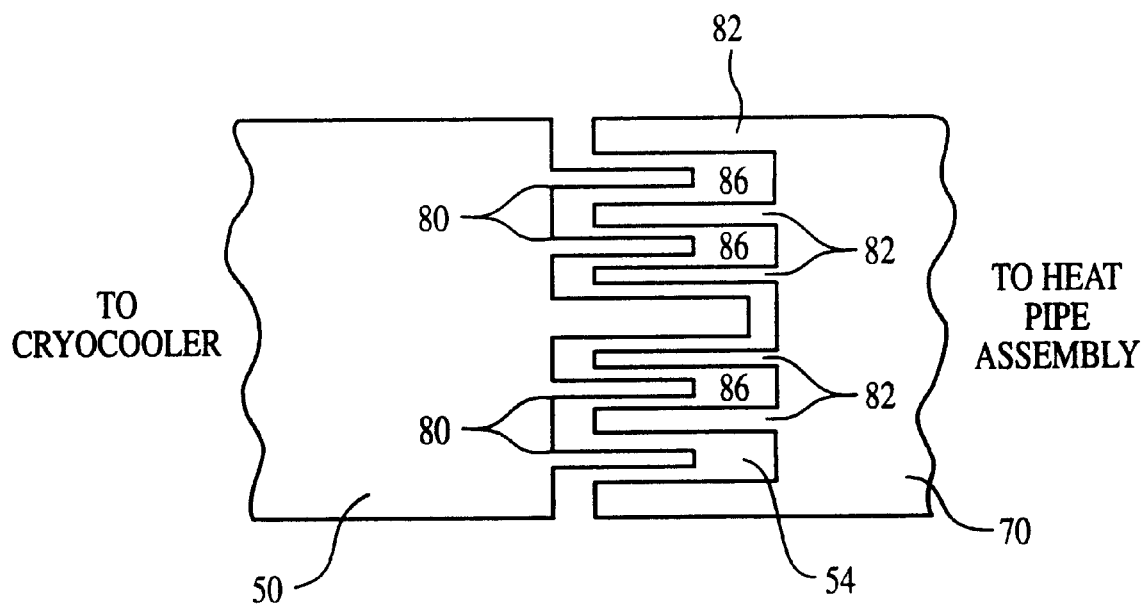
FIG. 13 illustrates a heat transfer gap assembly for providing the rotating to stationary heat transfer interface.

Referring to FIG. 13, because cryocooler 14 is stationary relative to rotor assembly 12, a heat transfer gap 54 is provided to allow heat from superconducting coil assemblies 26 to be conveyed to the cryocooler. In this embodiment, heat transfer gap 54 is in the form of a cryocooler extension 50 in the stationary side reference frame and a cylinder 70 on the rotating reference frame. Cryocooler extension 78 and cylinder 70 include sets of interleaved fins 80, 82, respectively, with the spaces between adjacent ones of the interleaved fins defining heat transfer gaps 86. Coolant introduced within heat transfer gaps 54 is cooled by contact with fins 80 of cryocooler extension 50.

Thus, when superconductor motor 10 is in operation, heat generated by superconducting coils 26 and parasitic heat leaks (e.g., radiation, conduction through structural supports and heat leak through the current leads) is required to be removed. In particular, the heat is transferred by conduction through cold support member 20 to heat pipe assembly 72, which is located in the rotating reference frame.

Referring again to FIG. 2, heat pipe assembly 72 represents a gravity-based neon heat pipe including six outer pipes 92 equally and circumferentially spaced about a central pipe 90. Outer pipes 92 are in thermal contact with the inner wall 94 of cold support member 20 and are connected at opposite ends of central pipe 90. The neon within pipes 92 flows axially away from the end of heat pipe assembly 72 closest to cryocooler 14 and extracts heat from superconducting coils 26. The warmed neon, now in the form of a gas, travels in central pipe 60 back toward interface 86, where it is cooled to a liquid by convection. This mass flux transfers the heat to coldhead 50 by convection and gas conduction through the coolant located in heat transfer gap 54.

When heat pipe assembly 72 is not rotating, for example, during cooldown of rotor assembly 12, heat pipe assembly 72 operates in a gravity based mode. Flow is provided by the liquid head acted upon by gravity. With heat pipe assembly 72 charged to 900 psi with neon at ambient temperature, at 27° K it has been calculated that there is sufficient liquid to fill outer pipes 92.

Further details of the construction and operation of the refrigeration system are described in Ser. No. 09/140,154, entitled Superconductor Rotor Cooling System, filed Aug. 26, 1998, and incorporated herein by reference. Further, cryocooler 14 may be used in conjunction with a cooling system for controlling the flow of coolant through heat pipe assembly 26, as described in U.S. Pat. No. 5,848,532, incorporated herein by reference.

Other embodiments are within the scope of the claims. For example, although cryocooler 14 was described as being a Gifford-McMahon cryocooler, other cooling systems, for example, pulse tube or Stirling cryocoolers, could also be used. Also, heat pipe assembly 72 was described above as using a pressurized neon coolant. Neon coolant is generally preferred when superconducting coils 26 are formed of BSCCO 2223. In an alternative embodiment, however, such as when the superconducting coils are formed of YBCO, the coolant passed through heat pipe assembly 72 may be pressurized oxygen or nitrogen.

As described above, superconducting synchronous motor 10 included a four HTS superconducting coil assemblies 26. The invention is applicable to other pole topologies (e.g., 6, 8, 12) and, thus, a larger number of coil assemblies may be used in other applications.

In certain applications, the coils of superconducting coil assembly 26 may be wound in a stacked arrangement with similar pancake coils. Alternatively, the individual coils may be constructed and stacked so that the coil assembly has a non-uniform or varying radial cross section relative to the longitudinal axis of the coil assembly. Such arrangements are described in PCT WO 96/122288, assigned to American Superconductor Corporation, assignee of the present invention, and incorporated herein by reference. In still other applications, it may be desirable to vary the geometry and/or the type of superconductor used to form the coils of superconductor coil assemblies 26. For example, to increase an otherwise low critical current characteristic, associated with higher field regions of the coil assemblies. Techniques for controlling these characteristics is described in U.S. Pat. No. 5,914,647, assigned to American Superconductor Corporation, assignee of the present invention, and incorporated herein by reference.

Still other embodiments are within the scope of the claims.

What is claimed is:

1. A superconducting rotating machine comprising:
   a stator assembly;
   a rotor assembly configured to rotate within the stator assembly and spaced from the stator assembly by a gap, the rotor assembly including:
      at least one high temperature superconducting winding assembly which, in operation, generates a magnetic flux linking the stator assembly; and
      a refrigeration system for cooling the at least one superconducting winding of the rotor assembly, the refrigeration system including:
         a cryocooler located in a stationary reference frame; and
         a closed circulation system external to the cryocooler interfacing the stationary reference frame with a rotating reference frame in which the superconductor winding assembly is located, the closed circulation system including a cooling pipe and a plurality of cooling tubes extending from the cooling pipe.

2. The superconducting rotating machine of claim 1 wherein the closed circulation system includes a heat transfer assembly located in the rotating reference frame.

3. The superconducting rotating machine of claim 2 wherein the closed circulation system further comprises a heat transfer gap defined between the cryocooler and the heat transfer assembly, the heat transfer assembly transferring heat from the at least one superconducting winding assembly to the heat transfer gap.

4. The superconducting rotating machine of claim 3 further comprising a coolant located in the heat transfer gap.

5. The superconducting rotating machine of claim 4 wherein the coolant comprises a coolant selected from the group consisting of helium, neon, nitrogen, and oxygen.

6. The superconducting rotating machine of claim 2 wherein the rotating heat transfer assembly includes a heat pipe having a first fluid path for directing a flow of liquid coolant from a cold end to a warm end of the heat transfer assembly, and a second fluid path for directing a flow of gas coolant from the warm end to the cold end of the heat transfer assembly.

7. The superconducting rotating machine of claim 6 wherein the coolant is neon.

8. The superconducting rotating machine of claim 6 further comprising a warm end conduction block mounted to the superconducting winding assembly and the heat pipe and defining the warm end of the heat transfer assembly.

9. The superconducting rotating machine of claim 6 further comprising a cold end conduction block mounted to the heat pipe and defining the cold end of the heat transfer assembly.

10. The superconducting rotating machine of claim 9 wherein the cold end conduction block includes a first plurality of fins and the cryocooler includes a second plurality of fins intermeshed with the first plurality of fins, the first plurality of fins being rotatable with respect to the second plurality of fins, a space between the intermeshed fins defining the heat transfer gap.

11. The superconducting rotating machine of claim 10 wherein the rotor assembly includes induction structure configured to allow the superconducting motor to generate a peak torque which is approximately twice the rated torque in the induction mode of operation.

12. The superconducting rotating machine of claim 11 wherein at least a portion of the induction structure is spaced from the at least one superconducting winding by a thermal isolation vacuum region.

13. The superconducting rotating machine of claim 12 wherein said at least portion of the induction structure includes an electromagnetic shield member.

14. The superconducting rotating machine of claim 13 wherein said electromagnetic shield member includes a conductive, non-magnetic material.

15. A superconducting rotating machine comprising:
a stator assembly, the stator assembly including:
  a cylindrical support tube having a bore extending along a longitudinal axis of the support tube; and
  at least one single-layer winding, each winding wound along the axis of the support tube;
a rotor assembly configured to rotate within the stator assembly and spaced from the stator assembly by a gap, the rotor assembly including:
  at least one high temperature superconducting winding assembly which, in operation, generates a magnetic flux linking the stator assembly;
a refrigeration system for cooling the at least one superconducting winding of the rotor assembly;
an outer banded member disposed around the at least one superconducting winding and formed of a high permeability material; and
wherein the outer banded material is a steel wire wound around the at least one superconducting winding.

16. A superconducting rotating machine comprising:
a stator assembly, the stator assembly including:
  a cylindrical support tube having a bore extending along a longitudinal axis of the support tube; and
  at least one single-layer winding, each winding wound along the axis of the support tube;
a rotor assembly configured to rotate within the stator assembly and spaced from the stator assembly by a gap, the rotor assembly including:
  at least one high temperature superconducting winding assembly which, in operation, generates a magnetic flux linking the stator assembly;
a refrigeration system for cooling the at least one superconducting winding of the rotor assembly;
an outer banded member disposed around the at least one superconducting winding and formed of a high permeability material;
an outer housing for enclosing the cylindrical support tube, the at least one single-layer winding, and the outer banded material; and
an encapsulating material surrounding the cylindrical support tube, the at least one single-layer winding, and the outer banded material adhesive within the outer housing.

* * * * *